United States Patent Office 3,320,310
Patented May 16, 1967

3,320,310
HETEROCYCLIC BORON-NITROGEN
COMPOUNDS
Mervin D. Marshall, Fombell, and Roy M. Adams, Darlington, Pa., assignors to Callery Chemical Company, Pittsburgh, Pa., a corporation of Pennsylvania
No Drawing. Filed May 28, 1964, Ser. No. 371,101
10 Claims. (Cl. 260—551)

This invention relates to novel heterocyclic boronnitrogen compounds in which the boron and nitrogen atoms are bonded together in the ring structure and to a method of making these compounds. More specifically these new compounds are amine or amino boranes and may consist of one, two, or three rings of five, six or seven members each.

We have discovered that a new class of heterocyclic boron compounds containing from one to three, five, six or seven-membered rings with one boron-nitrogen bond in each ring can be prepared by the reaction of diborane or amine boranes with an unsaturated amine of the general formula:

$$\left[ R_3-\underset{\underset{R_4}{|}}{C}=\underset{\underset{R_5}{|}}{\overset{R_6}{C}}-\underset{\underset{R_7}{|}}{\overset{}{C}}-\left(\underset{\underset{R_9}{|}}{\overset{R_8}{C}}\right)_n \right]_x N(R_1R_2)_{3-x}$$

Where $R_1$ is lower alkyl, $R_2$ through $R_9$ is hydrogen or lower alkyl, $n$ is 0, 1, or 2 and $x$ is 1, 2 or 3. The number of rings in the resulting compound is governed by the value of $x$. That is, when $x$ is 1, a monocyclic compound is produced; when $x$ is 2 a bicyclic compound is produced; and when $x$ is 3, a tricyclic compound is produced. The value of $n$ determines the size of each ring. That is, when $n$ is 0, five-membered rings are produced; when $n$ is 1, six-membered rings are produced; and when $n$ is 2, seven-membered rings are produced.

It appears that the reaction takes place in two steps. In the first step the amine group complexes with the borane, and in the second step the borane group reacts with the double bond to produce a cyclic compound, e.g. with dimethylallylamine:

$$2CH_2=CH \cdot CH_2N(CH_3)_2 + B_2H_6 \longrightarrow 2CH_2=CH-CH_2N:BH_3$$
$$\underset{(CH_3)_2}{|} \quad (1)$$

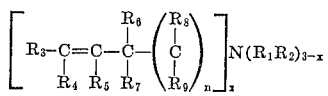

1,1-dimethyl-1-aza-2-boracyclo-pentane, 1,2-dihydro form

The first reaction occurs rapidly at room temperature while the second reaction requires a period of time, which is dependent on solvent and temperature conditions. The reaction is disclosed as a two-step reaction to the heterocyclic product to illustrate the reaction mechanism. However, if the unsaturated amine and borane source are reacted initially under conditions that will cause the cyclization reaction, the heterocyclic product will be produced in one step, with both reactions occurring concurrently.

If a tertiary amine is used as in Equations 1 and 2 an amine borane is produced. If a secondary amine is used, an amino borane results from the splitting out of one mole of hydrogen in the cyclization-heating step as follows:

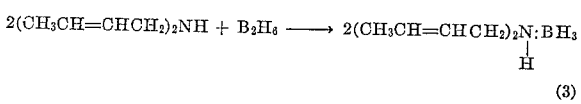

(3)

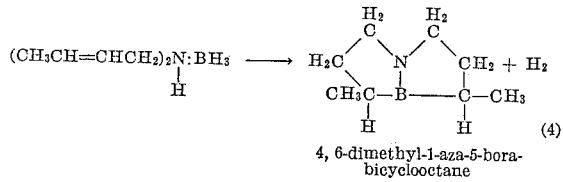

4,6-dimethyl-1-aza-5-borabicyclooctane

To illustrate our invention, a sample of dimethylallylamine was placed in a distilling flask with diethyl ether and diborane was passed into this solution. The mixture was then distilled and after the ether had been taken off, a viscous, colorless, clear liquid boiling at about 185° C. was recovered and shown by chemical and infra-red analysis to be 1,1-dimethyl-1-aza-5-bora-dihydrocyclo pentane. No double bonds were detected by the infrared analysis. The analysis found B, 11.1%; N, 14.3; C, 59.4; and H, 13.6 as compared with the theoretical of B, 11.0%; N, 14.2; C, 60.7 and H, 14.2. The mass spectrum shows a cut-off at mass number 99 and the largest peak at mass number 98 which is in good agreement with the formula weight of 98.98. The infra-red spectrum indicates an N—B bond and absence of C—C double bonds. The density at 25° C. is 0.8161 g./ml. and the index of refraction at 25° is 1.4538. The freezing point is approximately −25° C. The product is immiscible with water and miscible with ether and toluene.

In a like manner, the aminoborane, 1,4-dimethyl-1 aza-5-bora-cyclopentane is produced from N-methyl-2-butenyl amine and the amine borane 1,1,5-trimethyl-1-aza-6-bora-cyclohexane, 1,6-dihydroform is produced from N,N-dimethyl-3-pentenylamine.

The aminoborane, 1-aza-5-bora-bicyclooctane, having two identical rings of five members each is produced from diallylamine and diborane in ether. A liquid product was distilled from the reactor having a molecular weight, according to its mass spectrum of 108 (theoretical 109). The analyses consisted of the following: C, 56.0 mats/g.; H, 108.0 mats/g.; N, 7.9 mats/g. and B, 5.7 mats/g. This compares to the theoretical values of C, 55.2 mats/g.; H, 110 mats/g.; N, 9.2 mats/g. and B, 9.2 mats/g. for the proposed product. The index of refraction at 25° C. was 1.4820.

In like manner, the reaction of di(2-butenyl)-amine produces the bicyclic aminoborane, 4,6-dimethyl-1-aza-5-bora-bicyclooctane; while di(3-pentenyl)amine leads to the bicyclic aminoborane 5,7-dimethyl-1-aza-6-borabicyclodecane. Furthermore, the amine, N-methyl-di(3-butenyl)-amine produces the bicyclic aminoborane, 1-methyl - 1 - aza-6-bora-bicyclodecane, 1,6-dihydro form. The aminoborane, 1-aza-5-bora-cyclounedecane, 1,5-dihydroform, having three identical rings of five members each is produced from triallyl amine; while the three-ringed aminoborane having six members in each ring, namely, 1 - aza - 6-bora-tricyclotetradecane, 1,6-dihydro form is produced from tri(3-butenyl)amine, and the tricyclic amineborane with 7 members in each ring, namely 1-aza-7-bora-tricyclooctadecane, 1,7-dihydro form is produced from tris (4-pentenyl)amine.

In addition to the specific amines disclosed other secondary and tertiary amines having an unsaturated group in the 2-, 3 or 4 position will function in like manner to produce amineboranes and aminoboranes. This includes amines in which the alkenyl group has side groups which are non-reactive with the $BH_3$ group such as lower alkyl, alkoxy, halogen and the like.

The amineboranes and aminoboranes of our invention having B—H bonds, for example, 1,1-dimethyl-1-aza-5-bora-cyclopentane, 1,5-dihydro form which contains two B—H bonds, are used in the reduction of organic functional groups such as carbonyl etc., in the same manner as other amineboranes. The other amineboranes and aminoboranes produced hereunder are useful as lubricating oils and high temperature hydraulic fluids due to the high temperature characteristics of these materials. These new compounds are also useful as additives in minor amounts to diesel fuels as cetane-rating improvers or as additives in gasoline as octane requirement increase inhibitors.

Although diborane is the preferred borane source in our reaction, it is also possible to use saturated lower alkyl amine boranes or di(lower)alkoxyboranes for reaction with the unsaturated amines, since these compounds are also suitable borane sources. In the case of amine boranes, the lower alkyl amine is given off as a by-product, while in the case of di(lower)alkoxyboranes, diborane is inherently present in the solution as a product of disproportionation. When lower alkyl and lower alkoxy are used herein, it is meant to include groups having from 1 to 4 carbon atoms.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:
1. A compound having the formula

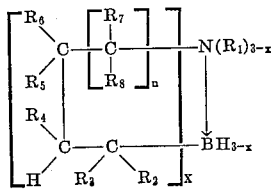

wherein $R_1$ represents lower alkyl having 1 to 4 carbon atoms, $R_2$ through $R_8$ represents hydrogen or lower alkyl having 1 to 4 carbon atoms, $n$ is an integer from 0 to 2 and $x$ is an integer 1 or 3.

2. A compound in accordance with claim 1 in which $n$ equals 1 and $x$ equals 1.
3. A compound in accordance with claim 1 in which $n$ equals 1 and $x$ equals 3.
4. A compound in accordance with claim 1 in which $n$ equals 0, and $x$ equals 1.
5. A compound in accordance with claim 1 in which $n$ equals 0 and $x$ equals 3.
6. A compound having the formula

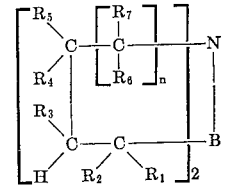

wherein $R_1$ through $R_7$ represents a member selected from the group consisting of hydrogen and lower alkyl having 1 to 4 carbon atoms, and $n$ is an integer from 0 to 2.

7. A compound in accordance with claim 6 in which $n$ equals 1.
8. A compound in accordance with claim 6 in which $n$ equals 0.
9. 1,1-dimethyl-1-aza-5-bora-cyclopentane, 1,5 - dihydro form.
10. 1-aza-5-bora-cyclooctane.

References Cited by the Examiner
UNITED STATES PATENTS 3,201,464    8/1965    Brown et al. _____ 260—551

OTHER REFERENCES

Adams et al.: Inorg. Chem., vol. 2, pp. 640–641 (June 1963).
Butler et al.: J. Am. Chem. Soc., vol. 86, p. 518 (Feb. 5, 1964).
White: S. Am. Chem. Soc., vol. 85, pp. 3634–3636 (Nov. 20, 1963).

WALTER A. MODANCE, *Primary Examiner.*

H. I. MOATZ, *Assistant Examiner.*